April 18, 1961  W. T. RENTSCHLER  2,979,998
PHOTOGRAPHIC CAMERA WITH COUPLED EXPOSURE METER
Filed Dec. 30, 1957  3 Sheets-Sheet 3

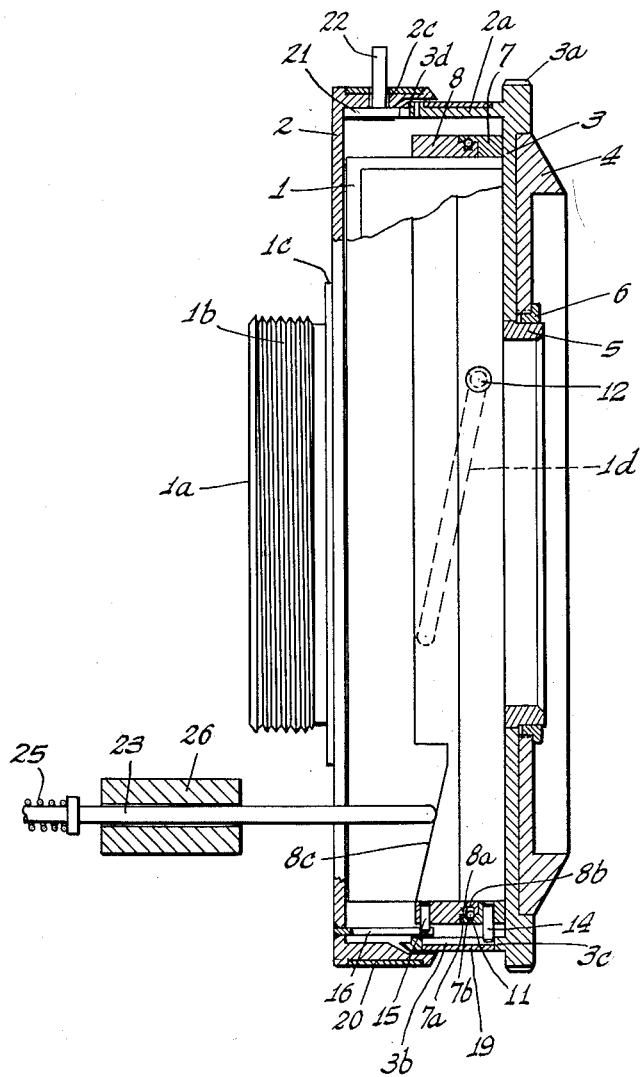

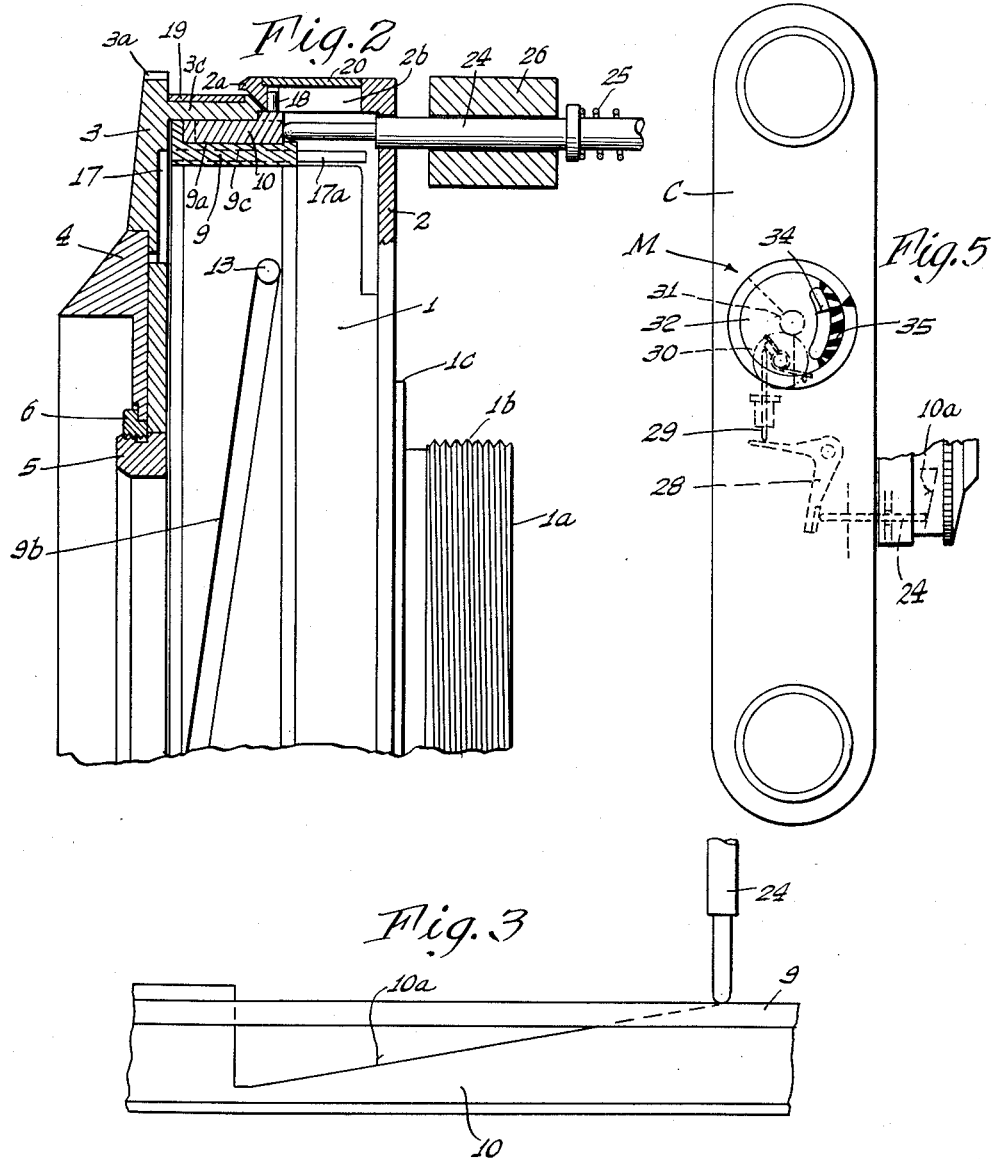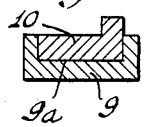

INVENTOR.
Waldemar T. Rentschler
BY
Munn, Liddy, Daniels & March
ATTORNEYS

United States Patent Office 2,979,998
Patented Apr. 18, 1961

2,979,998

PHOTOGRAPHIC CAMERA WITH COUPLED EXPOSURE METER

Waldemar T. Rentschler, Calmbach (Enz), Germany, assignor to Alfred Gauthier G.m.b.H., Calmbach (Enz), Germany, a corporation of Germany Filed Dec. 30, 1957, Ser. No. 706,023

Claims priority, application Germany Feb. 5, 1957

15 Claims. (Cl. 95—10)

The invention relates to photographic cameras of the type having diaphragm and speed setting members which are coupled with an exposure meter for the purpose of effecting adjustment of the camera to best suit prevailing conditions.

Various arrangements have been known or proposed in the past, for coupling the speed and diaphragm setting members of a camera with an exposure meter which is either built-in or otherwise arranged at the camera.

Considering these prior devices, where among other things gear-differential connections have been employed for this purpose, necessitating appreciable expense and causing various other difficulties, the present invention effects a marked improvement by providing, in a photographic camera of the above kind, a novel coupling connection between the setting members for diaphragm and speed and the exposure-meter tracing member which is characterized by a saving in parts and a simplified structure, as well as high accuracy in the transmission between the setting members and an exposure-meter tracing member. Moreover, the desirable accuracy of the device cannot be adversely influenced by the type of bearing which is provided for the setting members, and in addition the coupling connection may be applied with facility to all kinds of cameras.

According to the invention, the above objectives are attained by the provision of two control rings or ring pieces and associated structure which drive the exposure meter tracing member in response to movement of the respective setting members for the diaphragm and shutter speed. The said control rings or ring pieces are freely turnable with respect to each other and are preferably coaxially arranged. The first one of the two control rings is turned in response to the shifting motion of one of the two setting members and is also shiftable in an axial direction by means of a cam control device associated with it and with a fixed bearing cylinder, whereas the second control ring is turnable in response to the shifting movement of the other setting member, and is shiftable in an axial direction by the same amount as the first ring in response to the axial movement imparted to the latter, said second ring in addition carrying a control cam extending in a circumferential direction but acting axially, by means of which the tracing or setting member of the exposure meter may be actuated.

By such construction there is first the advantage that the connection between the setting members for diaphragm and speed requires only a small number of simple components which may be easily produced. Further, the relative arrangement of the setting members and of the ring coupling connection is flexible and capable of variation according to the invention, whereby the setting members and rings themselves may be connected to each other in a simple maner.

With regard to the desirable, high accuracy which is attained with the device, it is preferred that the rings be carried by a fixed bearing cylinder, and that they be connected to each other without clearance, thereby to faithfully translate the setting positions of the speed and diaphragm setting members to settings of the tracing member of the exposure meter with but minor deviation.

Moreover, the present invention may be easily applied to different types of cameras since a fixed cylinder may always be provided without difficulty at a suitable place in the camera, and since the necessary connection between the control rings, the said bearing cylinder and the setting members may readily be effected in a simple manner.

The cam control device between the first control ring and the fixed bearing cylinder can be constituted in different, advantageous manners, and therefore the device made according to the invention may be readily adapted to special structures or conditions of each camera. For instance, a multiple thread may be provided at the first control ring and the fixed bearing cylinder to constitute the cam control device therebetween. With such construction a smooth action and functioning of the rings without looseness in an axial direction is obtained, and thus the coupling device is characterized by an adequate capacity as well as by a simple assembly.

Where only a very limited space is available for the coupling device, it is advantageous to provide control grooves or slots in the bearing cylinder, to serve as the cam control device, said slots or grooves cooperating with a follower means on the first ring, as for example pins or lugs. Thus, on the one hand, the height of the first control ring can be kept very small, and on the other hand an extensive stroke or movement of the ring may be obtained.

This is particularly important where the setting member which has the greater movement is connected to the first ring.

In an other execution of the invention, adapted to conditions involving an appreciable axial displacement with only little turning and only small thickness of the mantle of the first control ring, the latter may be provided with a control device comprising grooves or slots which cooperate with follower means on the bearing cylinder which may, for instance, be rivets or screws.

A small radial dimension of the device as well as an advantageous supporting arrangement may be obtained when both control rings are carried by the bearing cylinder and are connected either positively or resiliently for concurrent axial movement.

With cameras wherein a small height of the fixed bearing cylinder is essential, a relatively great travel may be obtained in an advantageous manner for the exposure meter setting or tracing member by mounting the second control ring on the first one, and by connecting the rings together for concurrent axial movement by either a positive or yieldable drive.

A highly accurate performance of the present control device may be obtained, in the case where the two rings are connected by a positive drive, if the second control ring is arranged in a U-shaped guide provided in the first control ring.

A further advantageous arrangement of the two control rings in the camera structure, as regards appearance, functioning and saving of space is obtained by arranging the rings coaxially with respect to the lens axis.

Also, a very simple connection may be effected between the diaphragm and speed setting members and the said control rings of the device, according to the invention, when the setting members are ring-shaped and are arranged coaxially with respect to the control rings.

In the case of cameras which have lens shutters, desirably compact, simple and economical structure in accordance with the invention may be obtained where the two rings or at least the first ring are or is supported by the cylindrical external mantle of the side wall of the shutter housing.

With such cameras a closed appearance and structure protecting against outside influences and against sight may be advantageously obtained when the two control rings are covered by cylindrical mantles provided on the diaphragm and speed setting members and overlapping the side wall of the shutter housing.

By the provision of straight guides on the setting members and the control rings the said parts may be connected very simply, and at little expense.

A separable or detachable arrangement of the assemblage of the two control rings with respect to the exposure meter is made possible by providing a control cam on the second control ring, for cooperation with a transmission member which latter is connected by shape or power (positive or biased drive) with the tracing or setting member of the exposure meter.

With such organization a desirable simplicity may be obtained by using as a transmission member a pin shiftable in a direction parallel to the optical axis.

In further execution of the inventive thought it is advantageous, in attaining an easy adjustment of the camera, if the setting members for diaphragm and speed are coupled to each other by means of a well-known releasable coupling, in which case the cam control device of the first control ring and the control cam of the second ring (which influences the tracing or setting member of the exposure meter) are arranged and related to each other in a way that when the two setting members are displaced while in coupled condition, the tracing or setting member of the exposure meter will remain stationary or uninfluenced.

In the figures of the accompanying drawings the invention is illustrated by means of two different embodiments, each relating to a camera with a lens-type shutter.

Fig. 1 illustrates, partially in side elevation and partially in cross section, a photographic lens shutter having a device executed according to the invention which influences or drives a transmission member and serves to couple the setting members for diaphragm and speed with an exposure meter.

Fig. 2 is a fragmentary view along the lines of Fig. 1, showing a portion of a photographic lens shutter having a coupling device different from that of Fig. 1, said coupling device cooperating with a transmission member connected with an exposure meter.

Fig. 3 illustrates schematically portions of the coupling device of Fig. 2.

Fig. 4 illustrates in cross section the connections between the two control rings shown in Fig. 2.

Fig. 5 is a fragmentary top plan view of a camera with exposure meter and transmission member as controlled by the devices of Figs. 1 and 2.

Figure 6:
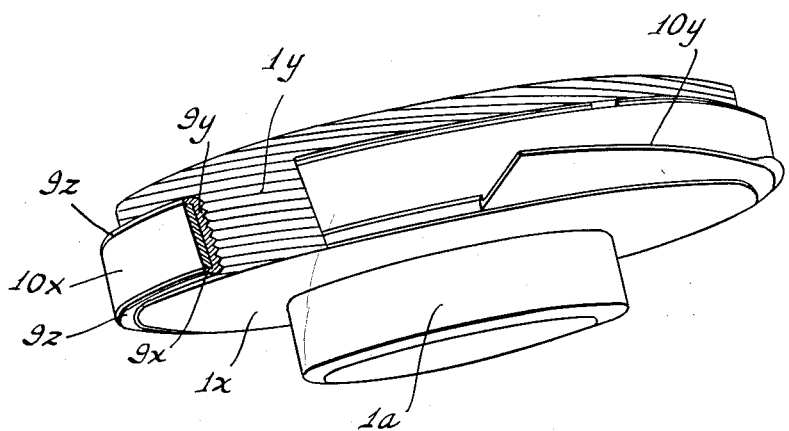
Fig. 6 is a perspective view, with portions cut away and shown in section, of a ring-mounting shutter housing structure carrying two control rings, and illustrating another embodiment of the invention.

In Figs. 1 and 2 the housing of a photographic lens shutter structure is indicated at 1. At the rear of the housing 1 a nozzle 1a is provided which serves to hold the usual lenses of the picture-taking lens assembly. By means of an external thread 1b on the nozzle 1a, and by a ring which is to be screwed onto this thread and which is not shown, the shutter structure may be attached to the camera proper in the well-known manner. Also, at the rear of the shutter structure there is supported in the well-known manner on a bearing shoulder 1c a diaphragm setting ring 2, while at the front of the housing 1 a speed setting ring 3 having a knurled rim 3a is arranged. For holding the speed setting ring 3 against axial movement there is provided a front plate 4, which in turn is held by a ring 6 adapted to be screwed onto the nozzle 5 of a shutter base plate (not drawn), and which carries in a well-known manner the various parts of the shutter mechanism.

To couple the setting rings 2 and 3 for diaphragm and shutter speed respectively with the tracing member or setting member of a well-known exposure meter M (Fig. 5) which is arranged at or incorporated in the camera C, according to the invention I provide two control rings or ring pieces, which are rotatably mounted and coaxially arranged with respect to each other. The first one of the control rings is turnable in response to the shifting movement of one of the two setting rings and is also shiftable in an axial direction by means of a cam control device associated with it and with a fixed bearing cylinder, while the second control ring is turnable in response to shifting movement of the other setting ring, and in response to the axial movement of the first ring the second one is shiftable axially by the same amount. Also, the said second ring carries a control cam extending circumferentially by means of which the tracing or setting member of the exposure meter may be actuated.

Thus the novel coupling device provided in accordance with the invention between the setting members and the exposure meter comprises only two simple rings which may be produced at little expense. For reasons of economy, a cylindrical means already available on the shutter may be preferably used as a bearing cylinder. For instance, lens holders, cylindrical housings of lens shutters, cylindrical shoulders at the camera housing, and so on, may be thus utilized.

As provided by the coupling device executed according to the invention, the driving connections between the setting members and the first and second control rings need transmit only turning motion. With each different arrangement of setting members and rings, such a connection may be effected without particular difficulty, and it enables the structure and the arrangement of the coupling device according to the invention to be adapted in the best possible way to the various factors and requirements of each camera.

Furthermore, where the connections between the control rings and the diaphragm and speed setting members need only transmit turning movement, a further important advantage follows in that inaccuracy and clearances in the bearings of the setting members, especially in an axial direction, will not exert any disadvantageous influence on the axial shifting motion of the control rings and accordingly on the displacement of the tracing or setting member of the exposure meter, and thus finally on the working accuracy of the device.

To obtain a simple and effective cooperation of the control rings with the tracing or setting member of the exposure meter carried by the camera on the one hand, and with the setting members for diaphragm and shutter speed on the other hand, it is advantageous to support the control rings coaxially with respect to the lens axis. This arrangement leads to short connections between the parts to be coupled, and in addition it provides for a closed and non-complicated structure of the camera. Particularly simple conditions and little expense characterize the connections of the control rings with the setting members for diaphragm and speed when the latter are also provided as rings coaxially arranged with respect to the two control rings.

In the illustrated embodiments of the invention specific coupling devices are shown in conjunction with the above arrangements of the rings, which evidence the inventive features described above.

The two control rings, which in the embodiment of the invention as per Fig. 1 are marked 7 and 8, and in the embodiment of the invention as per Figs. 2 to 4 are marked 9 and 10, are coaxially arranged with respect to the lens axis and the setting rings 2 and 3 for diaphragm or shutter speed respectively. According to the invention this is accomplished in such a manner that the cylindrical, external circumference of the shutter housing side wall may be utilized as a bearing cylinder for the rings.

By using the said shutter housing side wall as a bearing cylinder for the control rings, according to the invention, in cameras having lens type shutters there is made possible an especially economical, compact and simple coupling structure.

In the embodiment of the invention illustrated in Fig. 1, the two control rings 7 and 8 are rotatably carried by the shutter housing side wall and are positively connected to each other against relative axial movement. This positive connection is obtained by means of cooperable abutting shoulders 7a and 8a respectively provided on the two rings and overlapping each other, said shoulders having grooves 7b and 8b in which a spring ring 11 is inserted, keeping together the two control rings 7 and 8.

By the novel bearing arrangement of the two rings 7 and 8 as described above, the advantage is had that only little space is required in a radial direction.

In the embodiment of the invention illustrated in Figs. 2 and 4, an arrangement is shown by means of which the bearing cylinder may have little height while still providing for a comparatively great axial displacement of the control rings. In these figures the second ring 10, which cooperates with the tracing or setting member of the exposure meter, is rotatably carried by the first control ring, the two rings being positively connected against relative axial movement. The said positive connection is effected by arranging the second ring 10 in a U-shaped guide 9a (Fig. 4) provided in the first ring 9. As shown, such a guide may be simply obtained by a turning cut provided in the external circumference of the ring 9, corresponding to the breadth of the ring 10. In addition, this kind of guide insures in simple way a good fit of the second ring on the first one, because the U-shaped guide and the height of the second ring may be exactly fitted to each other by turning operations exclusively. Thus the positive connection shown between the two rings prevents practically any axial looseness and provides for high working accuracy of the device.

To facilitate the mounting of the rings 9 and 10 it is advantageous to form the latter not as a full ring, but instead as a partial ring and to secure the same in a well-known manner against falling out from its guide. Or, the ring 10 could be provided as a full ring which is cut open for the purpose of easily setting it into the guide 9a.

It has already been mentioned that according to the invention, a cam control device associated with the first control ring and with the fixed bearing cylinder serves for displacing the two control or coupling rings in an axial direction. Such cam device may be executed in different manners, to secure the greatest possible advantage for different camera factors and conditions.

In the embodiment of the invention illustrated in Fig. 1 the cam control device for the first ring 7 comprises control slots 1d in the shutter housing side wall into which pins 12 fixed on the ring 7 extend. These pins may be in the form of rivets or screws; in the same way, lugs could be bent off from the ring 7, directed towards the shutter axis, said lugs serving as follower means cooperating with the slots 1d.

As is obvious from Fig. 1, by this arrangement of the cam control device only a small height is required for the ring 7. Basically this height must be only such that the engaging or follower means, i.e. for instance the rivets, can be securely fixed to the ring.

Thus it is possible with a small height of the bearing cylinder which is constituted by the shutter housing, and where both rings rotate on the bearing cylinder, as shown in Fig. 1, a comparatively great axial shifting movement of the rings connected with each other may be achieved. In this respect it is advantageous to coordinate to the first control ring that one of the setting members with the greater shifting movements, so that the height of the second control ring carrying tthe control cam can be kept rather small. With a cam control device as per Fig. 1, as well as with a given height of the bearing cylinder the greatest shifting movement may be obtained when the rotary bearing for the second control ring is provided by the first ring. Therefore, this execution of the invention will be always of particular advantage when a great shifting movement is important together with small height of the bearing cylinder and when the space necessary for accommodating the second ring on the first ring is available in a radial direction. If, however, it is important to obtain a greatest possible shifting movement with a given height of the bearing cylinder and with the smallest possible dimensions of the device in a radial direction, then the arrangement as per Fig. 1 proves to be the most advantageous.

A different kind of cam control device is shown in Fig. 2. As shown therein, in the mantle of the first control ring 9 slots 9b are provided, which cooperate with pins 13 fixed on the shutter housing side wall as followers or engaging means. These pins may be expediently provided as rivets or screws. As to these special screws it should be noted that at their rear portions they have fixing threads, whereas at their front portions they have pin-like, smooth cylindrical surfaces.

The structure of the above-mentioned cam control device is especially distinguished by ease of fabrication and simple assembly. This is because the control slots may be easily provided in the mantle of the first control ring and the pins serving as followers, i.e. rivets or screws, may also be easily inserted in the slots.

Furthermore, while obtaining a great axial displacement of the first control ring the thickness of the latter may be small, because the surface of the mantle is interrupted only by the control slots 9b and unlike threads, the slots may be quickly cut or punched in the surface of the mantle, as shown in Fig. 2.

For the purpose of clarity of illustration, in Fig. 1 as well as in Fig. 2 only one control slot of the cam control device is shown. It is, however, advisable in obtaining an accurate guiding action as well as a smooth running of the rings, to arrange several control slots along the circumference of the bearing cylinder or the first ring, as for example three slots. Furthermore, instead of the control slots control grooves may be provided especially when for reasons of solidity it is desired not to break through the mantle of the first ring or the mantle of the bearing cylinder. Besides the cam control devices shown in Figs. 1 and 2, a thread-type guide may be provided between the first control ring and the bearing cylinder. To obtain an accurate guiding of the ring, a multiple thread is especially advisable.

In Fig. 6 there is illustrated a shutter housing 1x having the usual type of nozzle 1a, the exterior peripheral surface of the shutter housing 1x having multiple threads 1y. Carried by the housing 1x is a speed control ring 9x having multiple threads 9y which are cooperable and engaged with the threads 1y on the housing 1x. The speed control ring 9x has outturned end flanges 9z, between which there is disposed a diaphragm control ring 10x the latter having a camming edge 10y for engagement with the transmission pin 23. Thus it is seen that the construction of Fig. 6 is similar to that of Figs. 2 and 4, except that the speed control ring 9x in Fig. 6 is provided with multiple threads for engagement with multiple threads on the shutter housing.

By using a thread-type guide as a cam control device, in an especially simple manner a precise guiding of the coupling or control rings which prevents looseness may be achieved, and at the same time the first control ring can be easily and quickly mounted on the bearing cylinder. For reasons of solidity a thread-type guide necessitates, however, a certain minimum thickness of the wall of the first control ring. Furthermore, for obtaining a great axial displacement with a small shifting movement of the setting member coordinated to the control ring a coarse pitch thread is necessary. By such arrangement the radial space requirements for the first control ring are generally greater than with the execution of the cam control device as per Figs. 1 and 2.

According to the invention, the two coupling or control rings, i.e. in the illustrated embodiments of the invention the rings 7, 8 or 9, 10 respectively are turnable in response to shifting movement of the setting members for shutter speed and diaphragm. The driving connections between the respective setting members and the associated coupling or control rings may be carried out in an especially simple manner if the setting members and the control rings are coaxially arranged with respect to each other, as shown in the illustrated embodiments of the invention. By arranging straight cooperable guides at the rings and the setting members, these connections may be advantageously effected in an economical manner and without undesired looseness or play.

In the embodiment of the invention illustrated in Fig. 1 a straight guide is shown, comprising on the first ring 7 a fixed pin 14 which extends into a slot 3b of a cylindrical mantle 3c of the speed settting ring 3, the slot 3b being directed in a direction parallel to the shutter axis. A pin 15, which is fixed on the second ring 8, serves a straight guide for the second ring. The said pin 15 extends into a guide slot 16, which is parallel to the shutter axis and which is fixed on the diaphragm setting ring 2.

In the embodiment of the invention illustrated in Fig. 2 a thin ring 17, which is connected with the speed setting ring 3, serves as a straight guide for the first control ring 9, the ring 17 having an arm 17a bent off in a direction parallel to the shutter housing side wall. The arm 17a extends into a groove 9c provided in the ring 9. The second control ring 10, has a pin 18 which extends into a slot 2b provided in the cylindrical mantle 2a of the diaphragm setting ring 2.

Both the slot 3b in the mantle of the speed setting ring 3 (Fig. 1) and the slot 2b in the mantle of the diaphragm setting ring 2 (Fig. 2) are not visible from outside, being covered by metal bands 19 or 20 which may preferably carry in a well-known manner etched setting scales for diaphragm and shutter speed.

In a different manner a driving connection may be effected between the setting members for the diaphragm and shutter speed and the coupling or control rings carried by the bearing cylinder. For example, gear or toothed connections could be employed, in which case there could be relative axial movement between the coupling or control rings and the gear parts driving these rings. A drive device of this kind provides an effective and simple means for establishing a connection between setting members and control rings which are spaced apart an appreciable distance from each other.

As already pointed out in the above description of the straight guides, in the illustrated embodiments of the invention the diaphragm setting ring 2 and the speed setting ring 3 are provided with cylindrical mantles 2a or 3c respectively, which overlap the shutter housing side wall as well as each other. Thus the control device according to the invention is arranged between the external circumference of the shutter housing side wall and the internal walls of the said cylindrical mantles. In consequence, a very compact structure of the shutter may be had, which hides the device from view and protects it against outside influences which could prove detrimental to the working accuracy of the device. Furthermore, by the aforementioned execution an especially advantageous structure is obtained, from the standpoint of compactness.

By the provision of the cylindrical mantles 2a or 3c respectively there is at the same time advantageously made possible the use of a well-known releasable coupling means between the setting rings for shutter speed and diaphragm. Fig. 1 illustrates one form of such coupling. As shown, a cylindrical mantle 2a of the diaphragm setting ring 2 is provided with a resilient coupling claw 21 which latches into notches 3d of a cylindrical mantle 3c of the speed setting ring 3. For actuating the coupling a handle 22 is provided, which protrudes through a slot 2c in the mantle 2a. By pressing down the handle 22, the coupling between the setting rings 2 and 3 is released, and when the handle 22 is freed the coupling between the setting rings is again made effective.

The provision of a releasable coupling between the shutter speed and diaphragm setting members in conjunction with the present improved conjoint control thereby of the exposure meter tracing member enables additional advantages to be had. In the illustrated embodiments of the invention the cam control device of the first control ring and the control cam of the second control ring which influences the tracing or setting member of the exposure meter are related to each other in such a way that when the two setting rings are displaced while in coupled condition, the tracing or setting member of the exposure meter remains stationary and uninfluenced. This enables an especially easy operation or adjustment of the camera to be effected as regards the selection of a speed-diaphragm value corresponding to the existing picture-taking conditions, or the particular conditions desired by the person taking pictures.

Referring now to the coupling between the control rings and the exposure meter, it will be understood that by means of the control cam 8c or the cam 10a provided on the second ring 8 or the second ring 10 respectively, an exposure meter tracing or setting member may be directly influenced or driven. A desirably flexible, detachable or separable coupling of the control rings on the one hand and the exposure meter or its tracing or setting member on the other hand may readily be obtained, however, where the control cam is made to actuate an intermediary transmission member, which in turn is connected by shape or power (positive or biased drive) with the tracing or setting member of the meter.

For such purpose it is desirable, in obtaining a simple bearing, a readily workable arrangement and a simple connection to the control cam, to provide as the transmission member a pin which is longitudinally shiftable in a direction parallel to the lens axis. Such a transmission device is used as a basis for the illustrated embodiments of the invention, and in Fig. 1 the pin is marked 23 while in Fig. 2 it is marked 24. Such pins are under the action of a spring 25 by which they are maintained by power in engagement with the control cam 8c or the cam 10a.

In a different manner the connection between the transmission pin and the second control rings 8 or 10 could be effected by shape, that is, using a positive drive. For example, a rivet or crossing finger fixed on the pins 23 or 24 may extend into a control groove or control slot having the same pitch as the cams 8c or 10a. In such case the pins 23 or 24 necessitate a straight guide which may be carried on a fixed support 26.

The above connection by power between the exposure meter tracing or setting member and the second rings 8 or 10 effects however, an especially simple and economical structure.

Fig. 5 shows the camera C having an exposure meter M the tracing member of which is coupled to the setting members of a lens and shutter structure such as that of Figs. 1 and 2. The transmission pin 23 which is actuated by the control rings, transmits motion to a bellcrank 28 which in turn drives a longitudinally movable pin 29 acting on a gear sector 30 which latter drives a pinion 31 in the exposure meter M. The tracing member 32 of the exposure meter is connected with the pinion 31 to move therewith, and responds to changes in the position of the transmission pin 23, and such tracing member may be referred to the pointer 34 of the exposure meter, through the intermediary of a channel scale 35.

Thus the speed and diaphragm setting members may be adjusted in accordance with the indication of the exposure meter M, to properly set the camera for taking an exposure.

Considering the illustrated embodiments of the invention shown in the figures, the operation of the present improved camera made according to the invention is as follows:

When the speed setting ring 3 is turned, the first control ring 7 or 9 is simultaneously moved, and by means of the cam control device described it is shifted in an axial direction. Due to the connection existing between the first and second control rings, which can be effected by a biased drive as well as the positive drive shown in the illustrated embodiments of the invention, the second control ring participates in the axial displacement of the first ring. If using a biased drive between the two rings, the second ring would be preferably held against the first ring by one or several springs.

Owing to the above axial displacement of the two control rings, either the transmission pin 23 or the pin 24 engaging the control cam 8c or the cam 10a is shifted longitudinally by the same amount as the rings, effecting an actuation of the exposure meter tracing or setting member.

By the term exposure meter tracing or setting member there is meant each part or device by which in a well-known manner a coincidence between the exposure meter indicator and a setting mark is effected. This coincidence may be effected in any well-known manner by utilizing mechanical, electrical or optical instrumentalities.

Actuation of the exposure meter setting or tracing member may be effected not only by the axial displacement of the first control ring but also by actuation of the diaphragm setting ring 2. In such case the second control ring 8 or 10 is shifted by the setting ring, whereas the first control ring remains stationary due to the relative turning movement which is permitted between the two rings 7, 8 or 9, 10. The turning of ring 8 or 10 effects a turning of the control cam 8c or 10a and actuation of pin 23 or 24, and by this action the exposure meter tracing or setting member is shifted.

Thus, with the device made according to the invention, both the speed setting member as well as the diaphragm setting member may shift the exposure meter tracing or setting member in such a way that the position of the tracing or setting member always corresponds to the speed-diaphragm-proportion effected by the positions of the speed setting member and the diaphragm setting member.

When shifting the setting rings 2 and 3 individually, in the illustrated embodiments of the invention, the actuating or release handle 22 of the speed-diaphragm coupling must be pressed down. When the handle is again released, the coupling is again made effective and thereafter by actuating one or the other of the two rings a conjoint change of the settings for speed and diaphragm may be effected. Due to the above-described arrangement of the cam control device of the first control rings 7 or 9, and the control cams 8c or 10a provided on the second rings 8 or 10 as well as their relationship with each other it follows that the position of the pins 23 or 24 does not change. The aforementioned relation of the cam control device to the control cam, as well as their arrangement on control rings must be such that equal changes of diaphragm and speed, i.e. for instance doubling the speed or the size of the diaphragm aperture, are coordinated to equal axial displacements of the pin 23 or the pin 24 as effected by the control cam 8c or 10a respectively. This enables the device of the invention to readily be applied to cameras of any speed and diaphragm setting characteristic.

As already mentioned, the invention provides a novel and advantageous coupling device between the setting members for diaphragm and shutter speed on the one hand and an exposure meter on the other hand, which is especially simple and feasible as well as having a high working accuracy. Such coupling device is thus desirable in cameras of any kind.

In addition the device of this invention has utility not only in conjunction with exposure meters where the coincidence of the measuring device indicator and a setting mark is to be adjusted by eye, but also in any situation where there is to be a coupling between an exposure meter and setting members for diaphragm and shutter speed. For instance, the pin 23 or the pin 24 shown in the illustrated embodiments of the invention may be displaced in response to displacement of the movable part of an electrical measuring device of an exposure meter and may operate as a stop, which the cam provided on the second coupling ring may engage. For the purpose of effecting an unimpeded setting of the measuring device in this case, the setting members for speed and diaphragm could first be in respective end positions, in order to be subsequently displaced for the purpose of effecting the proper camera setting without the use of eyesight and in response to the exposure meter indication, until the said stop is engaged by the control cam of the second control ring, thus limiting the displacement. By this organization without the use of eyesight, a semi-automatic setting of the speed-diaphragm-proportion corresponding to the picture-taking conditions may be effected, that is, a proper speed-diaphragm value pair may be effected in the way described by coupled displacement of the setting members for speed and diaphragm.

Regardless of the way the present device made according to the invention may be used for semi-automatic setting of the setting members for diaphragm and speed in response to the exposure meter indication, the aforementioned advantages of simplicity, minimum number of parts, compactness, and ready practicability as well as high working accuracy will always be obtained.

I claim:

1. In a photographic camera, in combination, a diaphragm setting member; a speed setting member; a turnable and axially-movable diaphragm control ring turning in response to shifting movement of the diaphragm setting member; a turnable and axially-movable speed control ring turning in response to shifting movement of the speed setting member, said control rings being freely turnable with respect to each other and being coaxially arranged; a fixed bearing cylinder; means effecting axial movement of one of said rings in response to turning movement of the other ring, said means including a cam control device connected with said other ring and said bearing cylinder, and including means coupling the said control rings for concurrent and equal axial movement; an exposure meter having a tracing member; and means coupling said one control ring to said tracing member to actuate the latter in response to axial movement of said one control ring, including means comprising a control cam on and extending circumferentially of said one control ring and acting axially thereof, for actuating said tracing member in response to turning movement of said one control ring while the ring does not shift axially, said cam turning with said ring.

2. The invention as defined in claim 1 in which the means effecting axial movement of the one control ring includes multiple thread elements associated with said other control ring and with said bearing cylinder.

3. The invention as defined in claim 1 in which the means effecting axial movement of the one control ring comprises a set of slotted parts and a set of lug parts, said other control ring having one of said sets of parts.

4. The invention as defined in claim 3 in which the said other control ring carries the said set of slotted parts and the bearing cylinder carries the set of lug parts.

5. The invention as defined in claim 1 in which there are means radially guiding the said rings at the bearing cylinder, and in which the means effecting axial movement of the said one control ring includes cooperable abutting shoulders on the said rings.

6. The invention as defined in claim 1 in which one of the said rings has means providing a radial guide for the other of said rings, and in which the means effecting axial movement includes cooperable abutting shoulders on the said rings.

7. The invention as defined in claim 6 in which one of the said rings has a groove carrying the other ring and forming one of said abutting shoulders.

8. The invention as defined in claim 1 in which the said rings are concentrically arranged about the axis of the camera lens.

9. The invention as defined in claim 1 in which the setting members are rings connected respectively with the said control rings, all said rings being arranged concentrically about the axis of the camera lens.

10. The invention as defined in claim 1 in which there is a shutter housing having a cylindrical side wall, and in which at least one of said rings is mounted on the exterior of the said cylindrical side wall.

11. The invention as defined in claim 9 in which there is a shutter housing having a cylindrical side wall on which at least one of said control rings is mounted, and in which there is a cylindrical mantle provided at the setting members, overlapping said housing side wall and covering the said control rings.

12. The invention as defined in claim 1, in which there are straight guides connecting the setting members with their respective control rings to effect a drive therebetween.

13. The invention as defined in claim 1 in which the means coupling the control ring to the tracing member includes a transmission member having abutting engagement with said control cam.

14. The invention as defined in claim 13 in which the transmission member comprises a pin movable longitudinally in a direction parallel to the axis of the lens of the camera.

15. The invention as defined in claim 1 in which there is a releasable coupling between the setting members, and in which the means effecting axial movement of the one ring and the means actuating the tracing member have opposing actions which cancel each other to maintain the tracing member stationary when the setting rings are turned while coupled to each other.

References Cited in the file of this patent

UNITED STATES PATENTS

| | | |
|---|---|---|
| 2,169,927 | Riszdorfer | Aug. 15, 1939 |
| 2,190,729 | Nerwin | Feb. 20, 1940 |
| 2,252,573 | Leitz et al. | Aug. 12, 1941 |
| 2,305,294 | Kuppenbender | Dec. 15, 1942 |

FOREIGN PATENTS

| | | |
|---|---|---|
| 756,282 | Germany | Feb. 23, 1953 |
| 184,820 | Austria | Feb. 25, 1956 |
| 1,128,476 | France | Aug. 27, 1956 |
| 762,024 | Great Britain | Nov. 21, 1956 |